Oct. 13, 1942.  C. HUMMEL  2,298,644
METHOD OF AND DEVICE FOR THE PRODUCTION OF FOOD PASTE ARTICLES
Filed Sept. 9, 1940
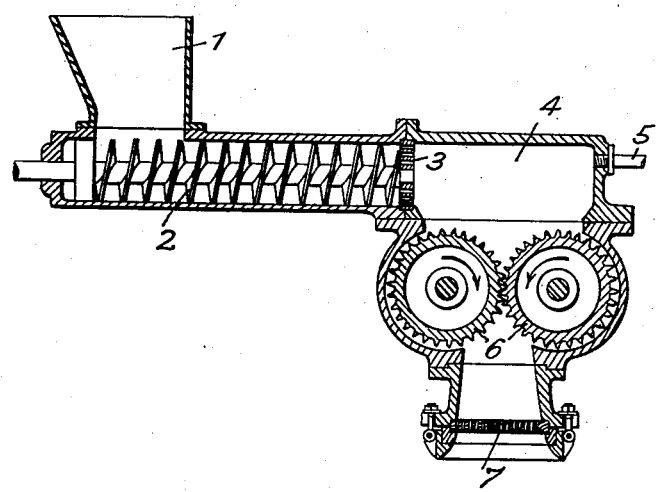
Inventor:
Charles Hummel
by Sommers & Young
Attorneys Patented Oct. 13, 1942

2,298,644

UNITED STATES PATENT OFFICE 2,298,644

METHOD OF AND DEVICE FOR THE PRODUCTION OF FOOD PASTE ARTICLES

Charles Hummel, Niederuzwil, Switzerland, assignor to Gebrüder Bühler, Uzwil, Switzerland Application September 9, 1940, Serial No. 356,067
In Switzerland September 11, 1939

4 Claims. (Cl. 107—54)

This invention relates to methods of and devices for the production of food paste articles.

Food paste articles, such as spaghetti, macaroni, and the like, present turbid misty surface portions. Formerly this was generally supposed to result from unequal drying, as an unavoidable consequence.

By thorough investigation it has now been found that these surface portions are formed by minute hollows containing entrapped air. Said turbid surface portions impair the appearance of the finished goods and are often the cause of formation of fissures in the goods, due to the fact that in drying the goods the thin film of material covering the hollows dries and hardens quicker than the remaining part of the surface, so that during the drying of this part said film is no longer elastic and is thus fissured. Again, in cooking the goods the hollows containing entrapped air have the detrimental effect of causing occasional bursts in the goods.

The object of the present invention is to eliminate the drawbacks resulting from the presence of entrapped air in the goods.

This is accomplished in the method according to the invention by passing the food paste, that is, the dough through a vacuum chamber prior to being brought into finished form. Advantageously the dough is forced through a sizing plate so as to enter the vacuum chamber in the form of separated thin strands.

The formation of the food paste articles is effected through the medium of press devices and die and sizing plates of well known kinds suitable for this purpose. In the continual working, the sealing of the vacuum chamber meets with no difficulties for the reason that the mass of the dough itself has a sealing effect at the entrance end and at the exit end of the vacuum chamber.

In the accompanying drawing, a press device for carrying the method according to the invention into effect is illustrated by way of example in a vertical section.

The casing of the press device shown is provided with a feed funnel 1 through which the dough is supplied to a worm conveyer 2 by means of which it is forced through a sizing plate 3, having a plurality of perforations, for separating the dough supplied into a corresponding number of individual dough strands. The dough strands leaving the plate 3 pass through a chamber 4 in which a vacuum is maintained for the purpose of extracting the air entrapped in the dough strands. Pipe 5 shows the connection to the vacuum pump which maintains the vacuum in the chamber 4.

The dough having thus been thoroughly freed from entrapped air is then withdrawn from the vacuum chamber by a gear pump 6 which feeds the deaerated dough to an extrusion die plate 7 through which it is discharged from the press device in the finished form of the food paste article to be produced. It will be seen that the dough supplied by the conveyer 2 seals the joint between the plate 3 and the casing of the device and thus the chamber 4 at the entrance end thereof, whereas the dough contained in the gear pump 6 seals the exit end of said chamber.

What I claim is:

1. In a press device for producing food paste articles, a vacuum chamber, a perforated member arranged at the entrance end of said vacuum chamber for sizing the food paste used for forming the article to be produced into individual food paste strands, conveyer means connected with said perforated member for passing said food paste through said member and said paste strands formed by said member through said chamber, for freeing said strands from entrapped air, further conveyer means connected with the exit end of said chamber for withdrawing said deaerated strands from said chamber, and an extrusion die arranged in front of said conveyer means for the latter to extrude said deaerated strand material through said die in the finished form of said article.

2. In a method of producing food paste articles, the steps comprising kneading non-fermented food paste containing entrapped air under superatmospheric pressure into a state of condensed texture, thereby displacing said air in the direction away from the interior of said paste into circumferential paste portions, instantaneously relieving said condensed paste of said pressure for releasing said air entrapped within said thus loosened texture, for deaerating said paste, and recondensing said deaerated non-fermented paste into the form of the articles to be produced.

3. In a method of producing food paste articles, the steps comprising continuously kneading non-fermented food paste containing entrapped air under superatmospheric pressure into separate paste strands of condensed texture, thereby displacing said air in the direction away from the interior of said strands into circumferential strand portions, instantaneously relieving said paste strands of said pressure for releasing said air entrapped within said thus loosened texture, for deaerating said strand paste material, and recondensing said deaerated material into the form of the articles to be produced.

4. In apparatus for producing food paste articles, means for continuously subjecting non-fermented food paste containing entrapped air to a kneading action under superatmospheric pressure, a sizing member for extruding said paste therethrough, by cooperating with said kneading means, into separate paste strands of condensed texture, thereby displacing said air in the direction away from the interior of said strands into circumferential strand portions, a vacuum chamber receiving said extruded strands for instantaneously relieving said paste strands of said pressure for releasing said air entrapped within said thus loosened texture for deaerating said strand paste material, said vacuum chamber having an exit for said material, and means connected with said exit for recondensing said deaerated material and expelling said material from said chamber in the form of the articles to be produced.

CHARLES HUMMEL.